(12) United States Patent
Ramond (10) Patent No.: US 6,743,009 B1
(45) Date of Patent: Jun. 1, 2004

(54) DEVICE FOR INJECTING MATERIAL IN A PLASTIC STATE INTO A MOULDING CAVITY

(75) Inventor: Louis Ramond, Chambery (FR)

(73) Assignee: Delachaux S.A., Genevilliers (FR)

( * ) Notice: Subject to any disclaimer, the term of this patent is extended or adjusted under 35 U.S.C. 154(b) by 0 days.

(21) Appl. No.: 10/030,557

(22) PCT Filed: Jul. 5, 2000

(86) PCT No.: PCT/FR00/01924

§ 371 (c)(1),
(2), (4) Date: Apr. 15, 2002

(87) PCT Pub. No.: WO01/02151

PCT Pub. Date: Jan. 11, 2001

(30) Foreign Application Priority Data

Jul. 6, 1999 (FR) .............................................. 99-08699
Mar. 28, 2000 (FR) .............................................. 00-03892

(51) Int. Cl.[7] .............................................. B29C 45/23
(52) U.S. Cl. ...................................... 425/564; 425/572
(58) Field of Search ................................ 425/564, 565, 425/566, 572

(56) References Cited

FOREIGN PATENT DOCUMENTS

| EP | 0873841 A2 | 10/1998 |
|---|---|---|
| JP | 09174612 | 8/1997 |

*Primary Examiner*—Tim Heitbrink
(74) *Attorney, Agent, or Firm*—Blakely, Sokoloff, Taylor & Zafman (57) ABSTRACT

A device for injecting material in a plastic state into a moulding cavity is presented. The device includes a distributor of material in a plastic state including at least one outlet for material in a plastic state, placed along a preset axis. The device also includes an injection nozzle including at least one component which is connected to the distributor by a detachable connection and defines for the injection nozzle a front surface configured in such a way as to become integral with the moulding cavity. The injection nozzle includes at least one channel for material in a plastic state, placed along the axis, placed in a fluid relationship with the outlet, and emerging in the front surface. The device controls blanking of the channel.

12 Claims, 3 Drawing Sheets

FIG_1

FIG_2a

FIG_3a

FIG_2b

FIG_3b

FIG_4

FIG_5

FIG_6

DEVICE FOR INJECTING MATERIAL IN A PLASTIC STATE INTO A MOULDING CAVITY

BACKGROUND OF THE INVENTION

The present invention relates to a device for injecting material in a plastic state into a moulding cavity, comprising particularly:

a distributor of material in a plastic state, comprising at least one outlet for material in a plastic state, placed along a pre-set axis, an injection nozzle comprising at least one component which is connected to the distributor by a detachable connection means and defines for the injection nozzle a front surface configured in such a way that it can become integral with the moulding cavity, the injection nozzle comprising at least one channel for material in a plastic state, placed along said axis and placed in a fluid relationship with said outlet, and emerging in said front surface, controlled means of blanking said channel.

It relates to such a device whatever the design furthermore of the distributor and of the injection nozzle and their arrangement relative to a mould defining the moulding cavity, it being understood that the position of the axis common to the distributor material outlet and to the injection nozzle and the position of the front surface of the latter relative to the moulding cavity are understood by reference to a "hot" state of the injection device and of the mould, namely the state they are in when they are brought to the temperature which they present under material injection conditions, with expansion phenomena taken into account.

A man skilled in the art knows that it is particularly important that when hot, the front surface of the nozzle is as perfectly integral as possible with the moulding cavity if it is required to avoid the presence of a space or an awkward contour, corresponding to this front surface, on the moulded component in the cavity. This concern is particularly significant when the shape of the cavity, in other words the shape of the component to be moulded, leads to the front surface of the nozzle being given a shape and an orientation different from a plane shape perpendicular to the common axis of the nozzle and the material outlet.

In the current state of the art, the nozzle is connected in a detachable way to the distributor by mutual screwing by means of a complementary screw thread and female screw thread provided respectively on one and in the other.

More exactly, in the frequent case in which the injection nozzle comprises particularly a nozzle end piece defining the front surface and a nozzle body inserted between the distributor and the nozzle end piece and connected to one and the other by a respective detachable connection means and in the equally frequent case in which the distributor comprises a channel for assembling an injection nozzle support, provided along the material outlet axis, and an injection nozzle assembly support, defining this outlet and connected to the distributor and to the injection nozzle by a respective detachable connection means, each of these detachable connection means is constituted by a female screw thread and a screw thread centred on the material outlet axis and provided respectively in one and on the other of the components to be connected in a detachable way.

This detachable connection mode does not in fact give complete satisfaction in the concern to make the front surface of the injection nozzle as integral as possible with the moulding cavity.

Indeed, the screwing relationship, along the material outlet axis, of the different components of the injection device directly connects the position of the front surface along this axis and its orientation around it.

To be sure, by accurate machining and by providing stops to restrict screwing, the front surface can be made to be as integral as possible with the cavity during a first assembly of the injection nozzle on the distributor, which is already tricky but may be corrected by adjustment after the first assembly if the precaution is taken initially to oversize the nozzle in the axial direction, but it is in practice impossible to recover the same conjugation of axial and angular positions of the front surface relative to the cavity when the nozzle is reassembled on the distributor after disassembly.

Stops restricting screwing may to advantage consist of annular plane bearing ends, of revolution around the material outlet axis, also providing the seal between the different components, but the sealing thus obtained during a first assembly is not necessarily recovered during reassembly after disassembly. Indeed, at reassembly, the concern to make the front surface of the nozzle as integral as possible with the cavity may be incompatible with that of establishing a seal contact between the bearing ends; in other words, it is difficult to seal in a durable way the screw thread and the female screw thread relative to the channel of material in a plastic state, considering the generally high pressure which this material generally reaches when it passes through the distributor and through the nozzle, and the material in a plastic state may insinuate itself into the female screw thread and screw thread and hamper operations of disassembly and re-assembly.

The purpose of the present invention is to overcome these drawbacks and, to this end, the present invention proposes a device of the type specified in the preamble, characterised in that said detachable connection means comprises:

means of indexing the angular position of said front surface in relation to the distributor, around said axis, and locking means fixing said front surface in relation to the distributor in the relative angular position imposed by the indexing means.

More exactly, when the injection nozzle comprises particularly a nozzle end piece defining said front surface and a nozzle body inserted between the distributor and the nozzle end piece and connected to one and the other by a respective connection means one of which, at least, is a detachable connection means, this detachable connection means, where necessary respective, comprises, according to the invention:

means of indexing in a relative angular position around said axis, mutual locking means in the relative angular position imposed by the indexing means.

This may be the case particularly when, according to an embodiment of the device according to the invention, the distributor comprises a nozzle body assembly channel, provided along said axis, and the nozzle body is engaged coaxially into said channel and defines said outlet.

Likewise, when, according to another embodiment, the distributor comprises an assembly channel for an injection nozzle assembly support, provided along said axis, and an injection nozzle assembly support, engaged coaxially in said channel, defining said outlet and connected to the distributor and to the injection nozzle by a respective connection means one of which, at least, is a detachable connection means, this detachable connection means, where necessary respective, comprises according to the invention:

means of indexing in a relative angular position around said axis, and mutual locking means in the relative angular position imposed by the indexing means.

A man skilled in the art will easily understand that, so long as the distributor and the nozzle, and more exactly their different components, and their indexing means have been appropriately designed and manufactured in such a way that at first assembly of the nozzle on the distributor, the front surface may become as integral as possible with the moulding cavity, the presence of the indexing means makes it possible to recover this position without difficulty after each disassembly of the nozzle.

This characteristic design of the invention is combined to advantage with the fact that the seals between the nozzle and the distributor, and more exactly, in the case of the embodiments previously mentioned, between the nozzle end piece and the nozzle body, the nozzle body and the distributor or more exactly, according to the case, the nozzle body and the nozzle assembly support, and this support and the distributor, are made by mutual support, along the direction of the material outlet axis, of bearing ends annular of revolution around this axis, plane and perpendicular to it, in the same way as in the prior art. Indeed, the independence, which it is possible to obtain through implementing the present invention, between the position of the front surface along the axis and its annular position around it allows the required seal to be provided even after disassembly and reassembly of the nozzle.

In a particularly straightforward way, the indexing means may comprise cotter pinning parallel to the material outlet axis, which cotter pinning may be common to the means of indexing the nozzle assembly support in an angular position relative to the distributor and to the indexing means of the injection nozzle in an angular position relative to the assembly support when such an assembly support is provided and connected to the distributor by a connection means comprising such indexing means and mutual locking means in the relative angular position imposed by these indexing means.

The mutual locking means may comprise to advantage mutual clamping by a ring annular of revolution around the material outlet axis, said ring being screwed by rotation around the latter onto a flange of one of the components to be assembled by tightly gripping with it a flange of the other component; it will be observed that, in a way sought after in accordance with the present invention, the degree of screwing of the ring has no influence on the axial position and the angular position of the front surface, and simply conditions the mutual support force, along the axis, of the above-mentioned sealing bearing ends.

When, in a way known per se, the controlled blanking means comprise at least one blanking pin mounted with axial sliding inside the injection nozzle channel, between a blanking position of the latter and an open position of the latter, and controlled means to make the pin slide from one to the other of said positions, located on the opposite side from the injection nozzle relative to the distributor along said axis and comprising controlled drive means, a component for transmitting motion between the drive means and the pin, placed in the axial extension of the latter, and a detachable connection means of said component and of the pin in an axial direction, allowing a relative free rotation around said axis, the device according to the invention comprises to advantage means for indexing the pin relative to the distributor in a preset relative angular position around said axis, for example in the form of cottering parallel to it.

For example, when the injection nozzle is assembled on the distributor by means of an assembly support according to an embodiment mentioned above, the means for indexing the pin relative to the distributor, for example cottering parallel to the axis, are to advantage constituted by means for indexing the pin relative to the injection nozzle assembly support. When, according to another embodiment mentioned above, the nozzle comprises a nozzle body engaged coaxially in an assembly channel provided in the distributor, the means for indexing the pin relative to the distributor, for example by cottering parallel to the axis, are to advantage constituted by means for indexing the pin relative to the nozzle body.

It is thus possible to ensure that the blanking pin also occupies a preset angular position not only on first assembly of the nozzle on the distributor but also after disassembly followed by reassembly, in other words still engages by the same zones with the same zones of the nozzle, particularly with a counterpart provided on the latter to provide blanking by engagement with the pin.

Additionally, this indexing of the blanking pin, by immobilising the latter against rotation relative to the distributor, makes it possible to provide the connection of the pin with the motion transmission component by a means screwed coaxially onto or in the pin, respectively an extension integral with it, without encountering for all that any difficulty in screwing or unscrewing this means during the initial assembly and maintenance operations.

However, such an arrangement is particularly advantageous when, to avoid the formation of an injection sprue on the moulded component in the cavity, the blanking pin has a front surface, configured in such a way that it can become integral with the moulding cavity in the blanking position, in a way known per se. Indeed, it is then possible to be sure that, at initial assembly and at any reassembly after disassembly, the front surface of the pin is appropriately orientated, in the same way as the front surface of the nozzle, so as to become as integral as possible with the cavity.

Such an arrangement is also particularly advantageous when, in a way known per se, in order to practise a multi-material injection, the injection nozzle channel is subdivided into several different elementary channels which are distributed angularly around the axis and each of which corresponds to one of the materials to be injected and may be blanked or opened in a controlled way by a respective pin, the different pins corresponding to the different elementary channels being a mutually juxtaposed along a plane including the axis or half-planes defined by the latter. Naturally, in such a case, the distributor comprises several material outlets distributed around an axis which is that of the nozzle.

Other characteristics and advantages of the invention will emerge from the description given below, in relation to the currently preferred example of implementation, and the appended drawings, which are an integral part of this description.

DETAILED DESCRIPTION OF THE INVENTION

Only components useful in understanding the device according to the invention have been shown and described in this implementation example, it being understood that this example can in no way be considered as restrictive.

In the first instance will be described the device according to the invention as shown in FIGS. 1 to 4, to which reference will be made for this purpose.

Figure 1:
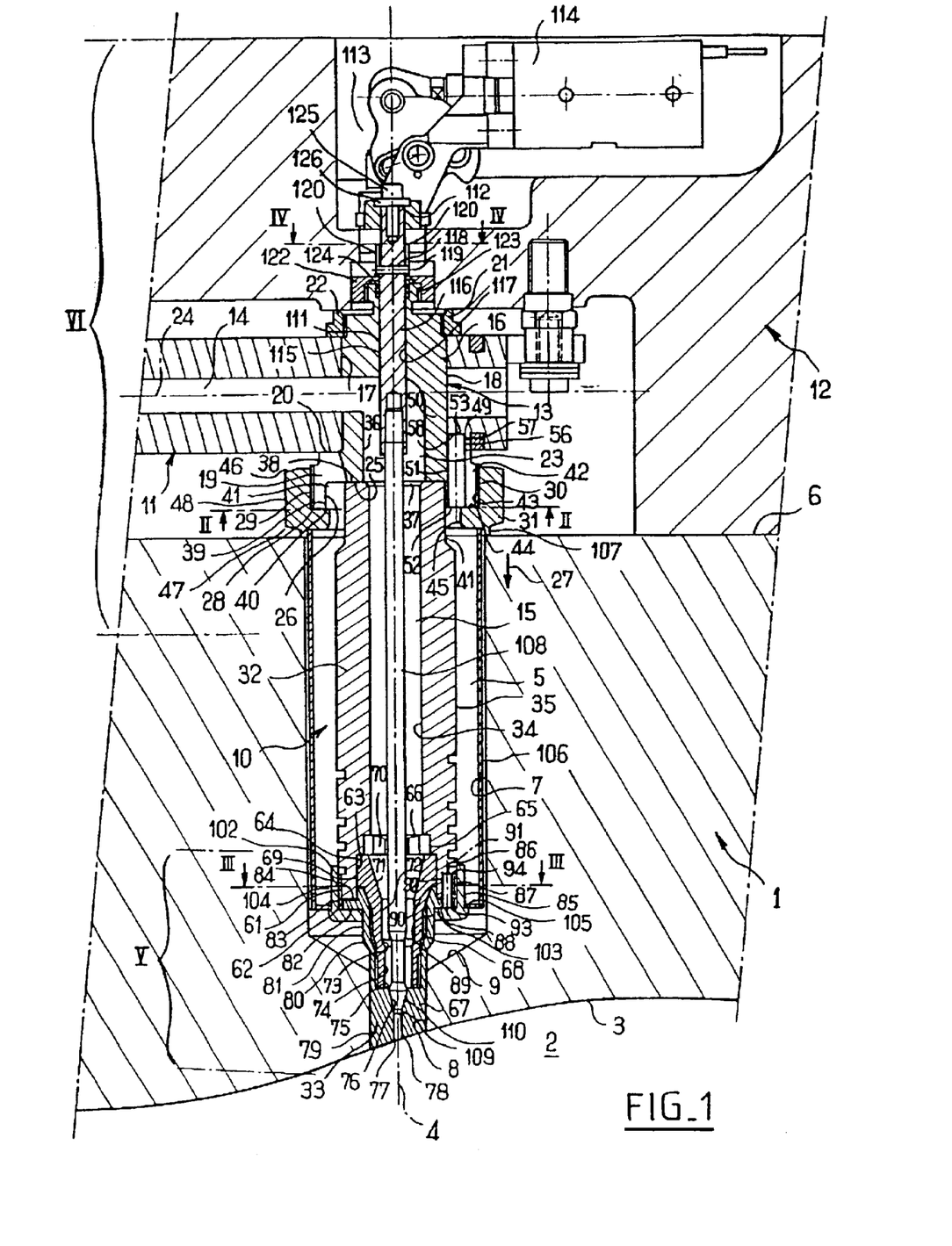
FIG. 1 shows a partial view of an injection device according to the invention, assembled on a mould, in cross-section by a plane including the common axis of the distributor material outlet and the injection nozzle.

In FIG. 1, has been shown as 1 a mould delimiting a moulding cavity 2 by a surface 3, which, in this example, is curved but could also be plane. Along an injection axis 4 occupying a preset position relative to the mould 1 is therein provided an injection well 5 which emerges along the axis 4 on the one hand in the surface 3 and on the other hand in a surface 6 of the mould 1, opposite the surface 3 along the injection axis 4. The surface 6 is plane and perpendicular to the axis 4, whereas, even considered in immediate proximity to this axis 4, the surface 3 has relative to it an oblique orientation, it being understood that the surface 3 could also be perpendicular to the axis 4 in immediate proximity to it.

In the example shown, the injection well 5 is delimited over the major part of its axial dimension, from the surface 6, by an internal peripheral surface 7 cylindrical of revolution around the axis 4 with a comparatively large diameter while it is delimited over a lesser part of its axial dimension, from the surface 3, by an internal peripheral surface 8 also cylindrical of revolution around the axis 4 but with an appreciably smaller diameter than that of the surface 7; these two surfaces 7 and 8 are mutually connected by an internal peripheral surface 9 truncated cone shaped of revolution around the axis 4 with a convergence in a direction 27 of the axis 4 going from the surface 6 towards the surface 3.

Inside the well 5 is housed coaxially an injection nozzle 10 carried in an integral and detachable way by a distributor 11 of material for injection, carried and maintained in a plastic state prior to its insertion into the distributor 11 by means not shown and until it reaches the cavity 2 by means of the injection nozzle 10.

The distributor 11 is mounted on a plate 12 fixed on the surface 6 of the mould 1 by means not shown, in conditions such that the distributor 11 can withstand expansion relative to the plate 12 and to the mould 1 as its temperature rises at the beginning of an injection operation, in conditions able to ensure the above-mentioned coaxiality of the nozzle 10 and of the injection well 5 when the distributor 11, the mould 1 and the plate 12 have stabilised at the temperature that they present during an injection process.

Subsequently, it will be considered that these conditions are met, in other words that the nozzle 10 is coaxial to the well 5, the axis 4 of which will consequently be considered as that of the nozzle 10.

The modes of assembling the distributor 11 on the plate 12 and the plate 12 on the surface 6 of the mould 1, to this end, are known by the man skilled in the art and are external to the present invention, such that they will not be described further.

The distributor 11 carries the nozzle 10 by means of a support 13 for assembling the latter, which additionally provides a fluid connection between a channel 14 for distributing material in a plastic state, provided in the distributor 11, and a channel 15 for conveying it from the distributor 11 to the interior of the cavity 2, provided in the nozzle 10 along the axis 4 and emerging along this axis, towards the interior of the cavity 2, in a front surface 78 of the nozzle 10.

The assembly support 13 is fitted along the axis 4 into the distributor 11, which, to this end, is pierced right through, along this axis 4, with a hole 16 delimited by an internal peripheral surface 17 cylindrical of revolution around the axis 4.

The hole 16 passes right through the channel 14, on each side of which there is a part of the surface 17.

Complementarily, the assembly support 13 has an external peripheral surface 18 cylindrical of revolution around the axis 4 with a diameter approximately identical to that of the surface 17 so as to allow coaxial fitting, without play, of the support 13 into the hole 16 of the distributor 11.

On the side of the cavity 2, which is also that of the nozzle 10, relative to the distributor 11 along the axis 4, the assembly support 13 has integrally a flange 19 annular of revolution around the axis 4 and forming a projection relative to the surface 18 in the direction of a distancing relative to this axis, which flange 19 is delimited towards the distributor 11 by a plane surface 20, annular of revolution around the axis 4 and forming relative to the surface 18 a shoulder which is supported flat, around the hole 16, against the distributor 11, in the direction opposite to the direction 27.

On the other side of the distributor 11 along the axis 4, in other words on the opposite side from the cavity 2 and the nozzle 10, the surface 18 of the assembly support 13 forms a projection along the axis 4 and has a screw thread 21, onto which is screwed a ring 22 annular of revolution around the axis 4, which ring 22 is supported flat in the direction 27 on the distributor 11 around the hole 16, on the opposite side from the shouldered surface 20 of the assembly support 13, in order to connect the latter in a detachable way to the distributor 11, in the position shown in FIG. 1.

In this position, an angled channel 23 provided in the support 13 emerges on the one hand inside the channel 14 of the distributor 11, for example along an axis 24 orientated at right angles relative to the axis 4, and on the other hand, along this axis 4, towards the cavity 2 to establish the fluid communication between the channel 14 of the distributor 11 and the channel 15 of the nozzle 10. The part of the angled channel 23 of the support 13, which is orientated along the axis 4, thus defines an outlet of the material in a plastic state coming from the distributor 11 towards the channel 15 of the nozzle 10.

More exactly, towards the cavity 2, the channel 23 emerges inside an annular, plane surface 25, of revolution around the axis 4 to which it is perpendicular, which surface 25 is turned in the direction 27 and defines a seal seat with the nozzle 10, as will be shown subsequently.

The surface 25 is extended, in the direction of a distancing relative to the axis 4, until it connects with an internal peripheral surface 26 of the flange 19, which surface 26 is cylindrical of revolution around the axis 4 and is itself connected, in the direction 27, to an annular, plane surface 28, of revolution around the axis 4, to which it is perpendicular, which surface 28 delimits the flange 19 towards the cavity 2.

In the direction of a distancing relative to the axis 4, the two surfaces 20 and 28 of the flange 19 are connected to an external peripheral surface 29 of the latter, which is cylindrical of revolution around the axis 4 and carries a screw thread 30 by which the flange 19 carries an annular ring 31 of revolution around the axis 4, acting as the integral but detachable connection of the nozzle 10 on the support 13 and, by means of the latter, on the distributor 11.

More exactly, in the example shown, in a way known per se, the nozzle 10 is essentially formed of the integral, but detachable, assembly of a nozzle body 32, which constitutes its part nearest to the distributor 11 and to the assembly support 13 and represents the major part of its dimension along the axis 4, and of a nozzle end piece 33 which connects this nozzle body 32 to the cavity 2.

The ring 31 then provides the integral but detachable connection of the nozzle body 32 on the assembly support 13.

The nozzle body 32 has a generally tubular shape of revolution around the axis 4, defined particularly by an internal peripheral surface 34 for the most part cylindrical of revolution around the axis 4 and delimiting the corresponding part of the channel 15, and by an external peripheral surface 35 also for the most part cylindrical of revolution around the axis 4.

The external peripheral surface 35 of the body 32 has a current diameter smaller than that of the internal peripheral surface 7 of the well 5, in which the body 32 penetrates over an axial dimension, with reference to the axis 4, smaller than that of this surface 7 so as to be integrally set back towards the distributor relative to the surface 9 of transition between the surfaces 7 and 8 of the well 5.

The internal peripheral surface 34 of the body 32 has a current diameter slightly smaller than that of an internal peripheral surface 36, cylindrical of revolution around the axis 4, which delimits the channel 23 of the support 13 at its mouth in the surface 25 of the latter, in other words at the outlet for the material in a plastic state from the distributor 11, but, in a narrowly localised end zone, at the connection between the nozzle 10 and the assembly support 13, the surface 34 has a truncated cone shaped flare 37 of revolution around the axis 4 up to the diameter of the surface 36 of the channel 23 so as to be connected with this diameter to an annular, plane surface 38, of revolution around the axis 4 to which it is perpendicular.

This surface 38 is turned in the direction opposite to the direction 27 and, by it, the nozzle body 32 is supported flat against the surface 25 of the support 13; the surface 38 creates on the body 32 a seal seat complementary to that created by the surface 25 of the assembly support 13 so as to establish a mutual sealed support of the nozzle body 32 and of the assembly support 13 around the channel 23 and 15 on the one hand, and to fix the position of the nozzle body 32 relative to the assembly support 13 and relative to the distributor 11 along the axis 4, on the other hand.

In the direction of a distancing relative to the axis 4, the surface 38 is connected to an external peripheral surface 39 cylindrical of revolution around the axis 4 with a diameter approximately identical to that of the surface 26 in such a way that, by the surfaces 38 and 39, the nozzle body 32 is fitted as accurately as possible into the assembly support 13, by the surfaces 25 and 26 of the latter.

On the opposite side from its connection with the surface 38 along the axis 4, namely in the direction 27, the surface 39 is connected to an annular, plane surface 40 of the nozzle body 32, which is annular of revolution around the axis 4 to which it is perpendicular and is spaced apart from the surface 38, along the axis 4, by a distance slightly greater than that which separates along this axis the surfaces 25 and 28 in such a way that the surface 40 is slightly offset in the direction 27 relative to the surface 28.

By this surface 40, the external peripheral surface 39 is connected to a comparatively contracted end zone of the external peripheral surface 35 of the nozzle body 32, such that the surfaces 38, 39 and 40 define around the contracted zone of the external peripheral surface 35 of the nozzle body 32 a flange 41 annular of revolution around the axis 4 and serving to connect the nozzle body 32 to the assembly support 13 by means of the ring 31.

To this end, the latter has an internal peripheral surface 42 cylindrical of revolution around the axis 4 and equipped with a female screw thread 43 complimenting the screw thread 30 of the external peripheral surface 29 of the assembly support 13 to allow screwing onto the latter and, in the direction 27, this external peripheral surface 42 is connected to an annular, plane surface 44 of revolution around the axis 4 to which it is perpendicular being turned in the direction opposite to the direction 27.

In the direction of moving closer relative to the axis 4, this surface 44 is connected to an internal peripheral surface 45 of the ring 31, this surface 45 being cylindrical of revolution around the axis 4 with a diameter smaller than the common diameter of the surfaces 26 and 39 but greater than that of the surface 35 particularly in its contracted zone 41, such that the surface 44 is located opposite the surface 28 of the assembly support 13 and a marginal zone of the surface 40 of the flange 41 of the nozzle 10.

Thus, the screwing of the ring 31 on the assembly support 13 is expressed by the flange 41 being tightly gripped between the surfaces 44 and 25 and the surface 38 being applied, by force, onto this surface 25.

The shape of the ring 31 is moreover immaterial in respect of the present invention. Its internal peripheral surface 42, in the direction opposite to the direction 27, and its internal peripheral surface 45, in the direction 27, are connected to a respective front surface 46, 47 annular of revolution around the axis 4 and, in the direction of a distancing relative to this axis 4, these two front surfaces 46, 47 are connected to an external peripheral surface 48 which may be formed of several sides giving it a polygonal, for example hexagonal, cross-section, when it is seen in cross-section by a plane perpendicular to the axis 4, to offer access to a screw and unscrew key of the ring 31.

In order to give to the assembly support 13, relative to the distributor 11, and to the nozzle body 32, relative to the assembly support 13 and to the distributor 11, a preset orientation around the axis 4 when assembling the nozzle 10 on the distributor 11 then at each reassembly following disassembly, means of indexing in a relative angular position around the axis 4 are provided in accordance with the present invention, in the example shown in the form of a cotter pin 49 of axis 50 parallel to the axis 4 and fixed relative to the flange 41 of the nozzle body 10, to the flange 19 of the assembly support 13 and to the distributor 11.

Figure 2A:
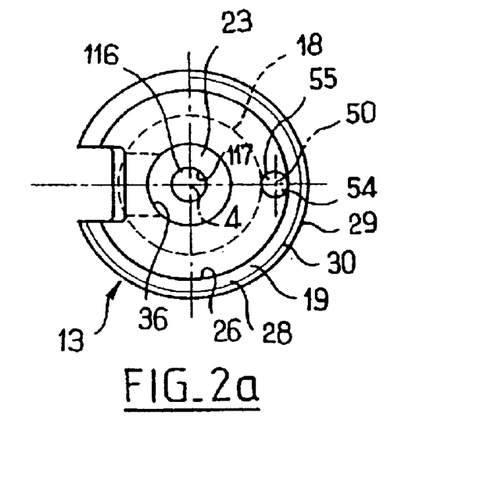
FIGS. 2a and 2b show, in a cross-section view along a plane perpendicular to said axis and given the reference II—II in FIG. 1, the injection nozzle support and the injection nozzle body respectively.

More exactly, in the example shown in which the cotter pin 49 is delimited in the direction of a distancing relative to the axis 50 by an external peripheral surface 51 cylindrical of revolution around the axis 50, between two end surfaces 52 and 53 plane and perpendicular to the axis 50, turned respectively in the direction 27 and in the opposite direction, the flange 19 of the assembly support 13 is pierced right through, along the axis 50, by a hole 54 which, as is shown in FIG. 2a, is delimited by an internal peripheral surface 55 cylindrical of revolution around the axis 50 with a diameter approximately identical to that of the external peripheral surface 51 of the cotter pin 49.

Thus, the coaxial engagement of the cotter pin 49 in the hole 54 immobilises the cotter pin 49, in any direction perpendicular to the axis 50, relative to the assembly support 13.

The diameter of the internal peripheral surface 26 of the flange 19 of the assembly support 13 being greater than that of its external peripheral surface 18, the axis 50 is located at a distance from the axis 4 intermediate between the respective radii of the surfaces 18 and 26, so as to be located between the latter, at a same distance from the one and from the other.

This distance corresponds to the common radius of the surfaces 51 and 55, such that the cotter pin 49, which protrudes on either side of the hole 54 along the axis 50, is tangential by its external peripheral surface 51, on the one hand to the surface 18 of the assembly support 13 by an end zone projecting relative to the surface 20 in the direction opposite to the direction 27 and on the other hand to the surface 26 of the flange 19 of the assembly support 13 by an end zone projecting relative to the surface 25 in the direction 27.

To receive the end zone of the cotter pin 49 which projects beyond the flange 19 by the surface 20, the distributor 11 is pierced along the axis 50, in the unreferenced support zone of the surface 20 of the flange 19, with a blind hole 56 emerging in the direction 27 and delimited on the one hand by an internal peripheral surface 57 cylindrical of revolution around the axis 50 with a diameter approximately identical to that of the external peripheral surface 51 of the cotter pin 49, and on the other hand by a plane bottom 58, perpendicular to the axis 4.

Figure 2B:
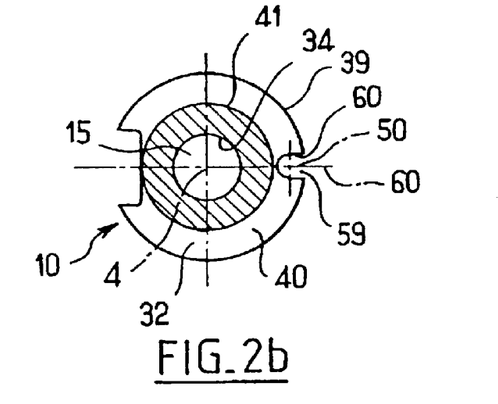

To receive the other end zone of the cotter pin 49 projecting beyond the flange 19 by its surface 25, the flange 41 of the nozzle body 32 is pierced right through along the axis 50, in other words from one to the other of its surfaces 38 and 40, with a notch 59 which, as is shown in FIG. 2b, also emerges in the external peripheral surface 39. Indeed, the notch 59 is delimited by an internal peripheral surface 60 which, between the axis 50 and the axis 4, has a zone semi-cylindrical of revolution around the axis 50 with a diameter approximately identical to that of the peripheral surface 55 of the hole 54 and to that of the external peripheral surface 51 of the cotter pin 49, this semi-cylindrical zone being connected to the external peripheral surface 39 by two plane zones, parallel to a plane 60 defined by the axes 4 and 50, mutually symmetrical relative to this plane 60 and mutually spaced apart by a distance equal to the diameter of the semi-cylindrical zone.

Along the axis 50, between its surfaces 52 and 53, the cotter pin 49 has a dimension approximately equal to the distance mutually separating, along the axis 4, the bottom 58 of the blind hole 56 of the distributor 11 and the surface 28 of the flange 19 of the assembly support 13 when the latter is applied by its surface 20 against the distributor 11 in such a way that, when the ring 31 is screwed onto the assembly support 13 sufficiently to place one against the other the surfaces 38 and 25 and when the ring 22 is sufficiently screwed onto the assembly support 13 to place it by its surface 20 against the distributor 11, the cotter pin 49 locked between the surface 44 of the ring 31 and the bottom 58 of the blind hole 49 is engaged at least partially in the blind hole 56 and the notch 59 passing right through the flange 19 of the assembly support 13 by the hole 55, a fact which provides the mutual alignment of the notch 59, the hole 55 and the blind hole 56 and thus fixes the relative angular position, around the axis 4, of the nozzle body 32, the assembly support 13 and the distributor 11.

A similar arrangement is adopted, in accordance with the present invention, for assembling the end piece 33 on the nozzle body 32 in a preset relative angular position, around the axis 4.

For the purpose of this assembly, in an end zone in the direction 27, the external peripheral surface 35 of the nozzle body 10 is equipped with a screw thread 61 of axis 4, and is connected to a front surface 62 of the body 32, which is annular of revolution around the axis 4, plane and perpendicular to it, and turned in the direction 27.

Towards the axis 4, this surface 62 is connected to an end zone 63 of the internal peripheral surface 34 of the nozzle 10, which end zone 63 is cylindrical of revolution around the axis 4 with a diameter greater than that of the surface 34 although smaller than that of the surface 35. This enlarged zone 63 connects the annular surface 62 to another annular surface 64, of revolution around the axis 4, plane and perpendicular to it, turned in the direction 27 and able to constitute a sealing bearing end for the end piece 33.

This surface 64 is itself connected, by a step 65, to the remainder of the surface 34.

The step 65, outside the present invention, will not be further described and it will simply be pointed out that its function is to allow the fitting into the nozzle body 32 and the locking, by the end piece 33, of an openwork ring 66 so as to constitute the least possible obstacle to the passage of the material in a plastic state. This ring 66 also lies outside the present invention and will not be further described. Its function, well known to the man skilled in the art, will simply be mentioned subsequently.

The end piece 33 is, in the example shown, constituted by two components each having, for the most part, a symmetry of revolution around the axis 4, namely an external component 67 and an internal component 68 forming a jacket fixed coaxially into the component 67. These two components could be replaced by a single component and will be considered as such below; in particular, no distinction will be made between the surfaces or surface parts of the end piece 33 which are defined respectively by one and the other of these components 67, 68.

The end piece 33 is designed to fit into the nozzle body 32 by its surface 63 and, to this end, has an external peripheral surface 69 cylindrical of revolution around the axis 4 with a diameter approximately equal to that of the surface 63.

In the direction opposite to the direction 27, the surface 69 is connected to an annular plane surface 70, of revolution around the axis 4, to which it is perpendicular, this surface 70 being turned in the direction opposite to the direction 27 and connecting the external peripheral surface 69 to an internal peripheral surface 71 truncated cone shaped of revolution around the axis 4 and narrowing in the direction 27, of a diameter which corresponds approximately to the current diameter of the surface 34 at the mutual connection of the surfaces 70 and 71, to a diameter smaller than the current diameter of the surface 34, at the connection of the internal truncated cone shaped peripheral surface 71 with an internal peripheral surface 72 cylindrical of revolution around the axis 4.

This surface 72 is itself connected in the direction 27 to another internal peripheral surface 73 truncated cone shaped of revolution around the axis 4 with a convergence in the direction 27 and providing the transition with an internal peripheral surface 74 again cylindrical of revolution around the axis 4 with a diameter smaller than that of the surface 72.

In the direction 27, this internal peripheral surface 74 is connected to an annular surface 75, of revolution around the axis 4, plane and turned in the direction opposite to the direction 27, which surface 75 is connected, in the direction of a moving closer relative to the axis 4, to a peripheral surface 76 truncated cone shaped of revolution around the axis 4 with a convergence in the direction 27.

The surface 76 is itself connected, in the direction 27, to an internal peripheral surface 77 cylindrical of revolution around the axis 4 with a diameter smaller than that of the surface 74, which surface 77 emerges towards the cavity 2 in the front surface 78, which is in fact a surface of the end piece 33 and has a shape and an orientation such that, at the operating temperature, it is integrated as accurately as possible with the surface 3.

In the direction of a distancing relative to the axis 4, the front surface 78 is connected to an external peripheral surface 79 of the end piece 33, which is cylindrical of revolution around the axis 4 and has a diameter approximately identical to that of the internal peripheral surface 8 of the well 5.

This surface 79 connects the surface 78, in the direction opposite to the direction 27, to an external peripheral surface 80 truncated cone shaped of revolution around the axis 4 with a convergence turned in the direction 27; the surface 79 has parallel to the axis 4 a sufficient dimension for the surface 80 to be located set back, in other words offset in the direction opposite to the direction 27, relative to the surface 9 of the well 5.

The surface 80 thus connects the surface 79 to another external peripheral surface 81, also cylindrical of revolution around the axis 4 but with a diameter greater than that of the surface 79, although smaller than that of the surface 69, which surface 81 is connected in the direction opposite to the direction 27 to a surface 82 annular of revolution around the axis 4, plane and perpendicular to it, turned in the direction 27.

This surface 82 connects the surface 81 to an external peripheral surface 83, cylindrical of revolution around the axis 4 with a diameter greater than the respective diameters of the surfaces 81 and 69 and slightly smaller than the current diameter of the peripheral surface 35 of the body 32, in other words than that of the screw thread 61.

In this direction 27, the surface 83 is connected to a surface 84 annular of revolution around the axis 4, plane and perpendicular to it, which surface 84 is turned in the direction opposite to the direction 27 and connects the surface 83 to the surface 69, by constituting around the end piece 33, with the surfaces 82 and 83, a flange 98 annular of revolution around the axis 4. The surface 84 is thus placed opposite the surface 62 of the body 32, but with no contact with the latter insofar as, along the axis 4, the surface 69 has between the surfaces 84 and 70 a dimension slightly larger than that which separates, along this axis 4, the surface 62 from the surface 64.

Thus, the nozzle end piece 33 may be fitted into the nozzle body 32 as far as bringing its surface 70 into sealing support against the surface 64 of the body 32, the surfaces 63 and 69 being placed in mutual sliding guiding contact along the axis 4 and the surfaces 62 and 69 being mutually separated along the axis 4 although being located in proximity to one another.

To provide the end piece 33 in such a position relative to the body 32 onto the screw thread 61 is screwed a clamp ring 85 which has, to this end, an internal peripheral surface 86 cylindrical of revolution around the axis 4 with a diameter approximately identical to the current diameter of the external peripheral surface 35 of the body 32, this surface 86 being fitted with a female screw thread 87 complementing the screw thread 61 of the body 35 so as to engage with the latter.

In the direction 27, the internal peripheral surface of the clamp ring 85 is connected to a surface 80 of the latter, annular of revolution around the axis 4, plane and perpendicular to it and turned in the direction opposite to the direction 27, which surface 88 connects the surface 86, in the direction of a moving closer relative to the axis 4, to an internal peripheral surface 89 cylindrical of revolution around the axis 4 with a diameter approximately identical to that of the external peripheral surface 81 of the end piece 33.

So, by screwing the ring 85 onto the body 32 by the screw thread 61 and the female screw thread 87, by tightly gripping the flange 98 between the ring 85 and the body 32, the surface 70 of the end piece 33 is brought to a stop against the surface 64, a fact which provides on the one hand the relative seal and on the other hand fixes the position of the end piece 33 relative to the body 32 along the axis 4, which complements the aforementioned effect of exact positioning of the nozzle body 32 along the axis 4 relative to the distributor 11 so as to place the end piece 33, particularly the front surface 78, in an exact position, along the axis 4, relative to the distributor 11. Additionally, the end piece 33 then locks the ring 66 in the step 65.

When screwing, it is particularly important for the end piece 33 to preserve, relative to the body 32, around the axis 4, an orientation such that the front surface 78 can become as integral as possible with the surface 3 of the mould 1.

To provide such an orientation on assembly, as well as on re-assembly after disassembly, of the nozzle 10 relative to the distributor 11, in accordance with the present invention indexing is provided of the end piece 33 in orientation around the axis 4 relative to the nozzle body 32, which indexing complements the indexing of the body 32 relative to the assembly support 13 and the indexing of the assembly support 13 relative to the distributor 11, provided by the cotter pin 49, so as to ensure the correct angular positioning of the end piece 33.

In the example shown, this indexing is also provided by a cotter pin 90 of axis 91 parallel to the axis 4, which cotter pin 90 has a peripheral surface 92 cylindrical of revolution around the axis 91 between two end surfaces 93 and 94 plane and perpendicular to this axis.

Figure 3A:
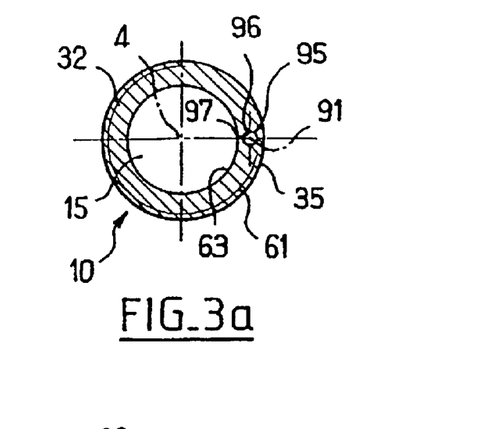
FIGS. 3a and 3b show, in a cross-section view along a plane perpendicular to said axis and given the reference III—III in FIG. 1, the nozzle body and the nozzle end piece respectively.

To receive the cotter pin 90, as is shown in FIG. 3a, the nozzle body 10 is pierced in its surface 62, between the surface 63 and the screw thread 61 of its surface 35, by a blind hole 95 of axis 91, which blind hole is delimited by an internal peripheral surface 96 cylindrical of revolution around the axis 91 with a diameter approximately identical to that of the external peripheral surface 92 of the cotter pin 90, and by a bottom 97 plane and perpendicular to the axis 91, a fact which allows the cotter pin 91 to be immobilised relative to the nozzle body 32 in any direction perpendicular to the axis 91.

Figure 3B:
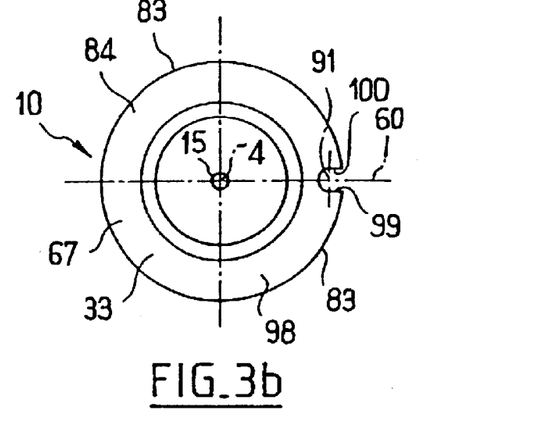
Figure 4:
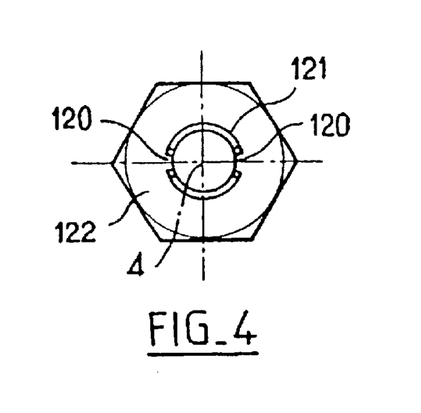
FIG. 4 shows, in a cross-section view along a plane perpendicular to said axis and given the reference IV—IV, a component for indexing the blanking pin relative to the support for assembling the nozzle on the distributor.

As is shown in FIG. 3b, the nozzle end piece 33, or more exactly its component 67 which defines the surfaces 82, 83, 84, constituting around the end piece 33 the flange 98 engaging with the surface 88 of the clamp ring 85 so as to provide the fixing of the end piece 33 on the nozzle body 32, has a notch 99 which passes right through the flange 98, in other words from one to the other of the surfaces 82 and 84, along the axis 91.

This notch 99 is delimited by an internal peripheral surface 100 which, in a zone turned towards the axis 4, is semi-cylindrical of revolution around the axis 91 with a diameter approximately identical to that of the external peripheral surface 92 of the cotter pin 90 while in other respects it has two plane zones which connect this semi-cylindrical zone to the external peripheral surface 83 in which the notch 99 emerges. These two plane zones are parallel to the aforementioned plane 60, in which the axis 91 is located in this example like the axes 54, and are mutually symmetrical relative to this plane 60 being mutually spaced apart, perpendicular to it, by a distance corresponding to the diameter of the semi-cylindrical zone.

Along its axis 91, between its end surfaces 93 and 94, the cotter pin 19 has a dimension approximately identical to the total of the respective dimensions of the hole 95 and of the flange 98, between its surfaces 82 and.84, parallel to the axis 4 in such a way that in all circumstances, so long as the clamp ring 85 is fully screwed onto the nozzle body 32 tightly gripping the flange 98, the cotter pin 91, which is prevented from escaping by the surface 88 of the ring 85 and the bottom 97 of the blind hole 95, is permanently placed at least partly in the blind hole 95 and at least partly in the notch 99.

Like the clamp ring 31, the clamp ring 85 may have any required shape outside its surfaces 86 and, 88, 89.

In the example shown, the surfaces 86 and 89 are connected, in the direction opposite to the direction 27 and in the direction 27 respectively, to a respective front surface 102, 103, annular of revolution around the axis 4, plane and perpendicular to it, the two front surfaces 102 and 103 connecting, in the direction of a distancing relative to the axis 4, to an external peripheral surface 104 for example cylindrical of revolution around the axis 4 with a diameter smaller than that of the internal peripheral surface 7 of the well 5.

As is shown, the surface 104 may have a shoulder 105, annular of revolution around the axis 4, so as to lock onto the front surface 47 of the ring 31 a tubular casing 105 which encases the nozzle body 32 coaxially inside the well 5 in order to protect different accessory devices not shown, such as means for the thermal regulation of the body 32 in order to ensure that the latter is at the temperature to maintain the fluidity of the material to be injected, during the injection. The casing 106 may to advantage be furthermore locked in a coaxial position, at the level of the ring 31, by an annular shoulder 107, of revolution around the axis 4, projecting over the front surface 47 of the ring 31.

To operate a controlled opening and closing of the channel 15 at the level of the end piece 33, within this channel 15 is housed coaxially a blanking pin 108 the shape of which, known per se, will not be described in detail.

It will simply be recalled that it terminates in the direction 27 in a plane front surface 109, perpendicular to the axis 4 in the shape of a disc of intermediate diameter between the end diameters of the internal peripheral surface 76 of the end piece 33 while it is delimited, immediately upstream of the front surface 109 with reference to the direction 27, by an external peripheral surface 110 truncated cone shaped of revolution around the axis 4 with a taper identical to that of the surface 76 in such a way as to be able to be applied against the latter, in a relationship of mutual sealing, in a limit position of the rod 108 in the direction 27 relative to the end piece 33, which position is consequently a blanking position of the channel 15, and to be able to separate itself from the surface 76 by translation along the axis 4 in the direction opposite to the direction 27, in a controlled way in order to clear the channel 15 towards the cavity 2.

The blanking pin 108 is guided, in its controlled translation movements along the axis 4 relative to the nozzle body 32 towards the open position or the blanking position, by the aforementioned ring 66, at the connection between the nozzle body 32 and the end piece 33.

Furthermore, inside the channel 23, the pin 108 is guided with coaxial sliding in the assembly support 13 by a coaxial extension 111 into which it is screwed coaxially or to which it is connected by any other means.

The coaxial extension 111 passes right through the assembly support 13 and has outside the distributor 11, on the opposite side from the nozzle relative to it along the axis 4, an end 112 into which is screwed in an integral but detachable way a bolt 125 bearing integrally a collar 126, annular of revolution around the axis 4, connecting in respect of a joint translation movement along the axis 4 with a motion transmission component 113 of a controlled drive means 114, such as a hydraulic jack, the controlled activation of which makes it possible, through the transmission component 113, either to pull the end 112 along the axis 4, in the direction opposite to the direction 27, in order to bring the pin 108 to an opened position of the channel 15 towards the cavity 2, or to push the pin 108 in order to bring its surface 110 into sealed support on the surface 76, in other words to bring the pin 108 into a position blanking the channel 15.

The jack 114 or another drive means and the component 113 will not be described further, just as no further description will be given of their mode of connection with the collar 126 connected in a detachable way to the end 112 of the extension 111 of the pin 108, except to state that the connection between the collar 126 and the component 113 leaves the extension 111 of the pin 108, and this pin 108 itself, free to rotate around the axis 4 relative to the transmission component 113 and relative to the unit formed by the distributor 11, the support 13 and the nozzle 10.

In this respect, the extension 111 of the rod 108 is delimited in the direction of a distancing relative to the axis 4 by an external peripheral surface 115 cylindrical of revolution around the axis 4, relative to which the collar 126 projects in the direction of a distancing relative to this axis 4, and passes through the assembly support 13 by a coaxial hole 116 itself delimited by an internal peripheral surface 117 cylindrical of revolution around the axis 4, with a diameter approximately identical to that of the surface 115.

In order however to provide an immobilisation of the rod 108 to rotation around the axis 4 relative to the unit formed by the distributor 11, the assembly support 13 and the nozzle 10, the extension 111 of the pin 108 carries integrally and in a detachable way, in a zone located between the support 13 and the end 112, a cotter pin 118 placed along an axis 119 perpendicular to the axis 4, and this cotter pin 118 has two end zones projecting relative to the external peripheral surface 115 of the extension 111, on either side of it respectively along the axis 119.

By these two end zones, the cotter pin 118 engages in a respective rectilinear slot 120, parallel to the axis 4, of a tubular sleeve 121 of revolution around the axis 4, carried integrally by a nut cover 122 screwed tightly onto a threaded end piece 123 which the support 13 has integrally around the mouth of the hole 116 at the opposite side from the nozzle 10 relative to the distributor 11.

This nut cover 122 also serves to lock around the external peripheral surface 115 of the extension 111 of the pin 108 a ring 124 for sealing relative to the assembly support 13.

It may easily be observed that, so long as the nut 122 is fully screwed onto the end piece 123 and is consequently integral with the latter although detachable, the engagement of the ends of the cotter pin 118 with the grooves 120 prevents the extension 111 of the pin 108, as well as the latter, from rotating relative to the assembly support 13 by engaging with the grooves 120 in the manner of a cottering parallel to the axis 4.

The result of this is that it is much easier to screw or unscrew the bolt 125 in respect of the extension 111 of the pin 108 for the purpose of functionally connecting the latter to the transmission component 113 or disconnecting it from it at assembly and during maintenance operations.

Figure 5:
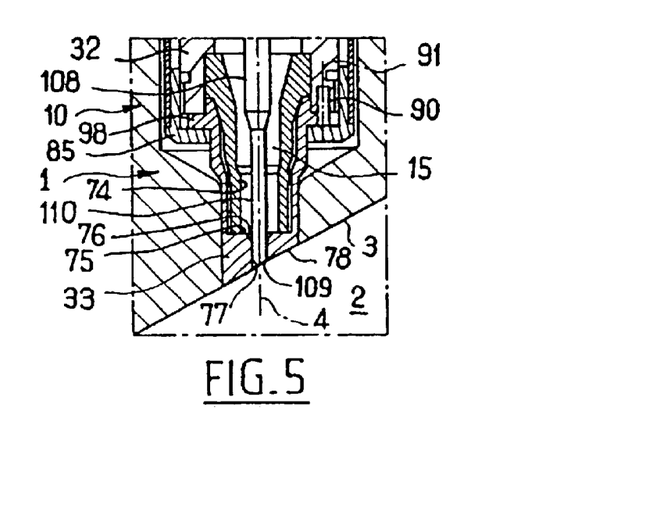
FIG. 5 shows an embodiment variant of a detail given the reference V in FIG. 1, in a view similar to that in this FIG. 1.

An additional result is that the pin 108 permanently occupies and recovers after disassembly and reassembly a preset angular position around the axis 4, relative to the seal seat constituted by the surface 76 in the example shown and relative to the cavity 3, a fact which offers a particular advantage in certain embodiment variants of the injection device, one example of which is shown in FIG. 5.

The variant shown in FIG. 5 differs from the mode of implementation of the invention described with reference to FIGS. 1 to 4 only in the configuration of the pin 108 and of the channel 15 in their zone closest to the cavity 2, such that in FIG. 5 are again found, under the numerical references 1, 2, 3, 4, 10, 15, 32, 33, 74 to 78, 85, 90, 91, 98, 108, the components or component parts which were described using these references relative to the embodiment in FIGS. 1 to 4, either identically, or with immaterial differences in respect of the present invention, or with differences which will now be described.

In the case of this embodiment, the truncated cone shaped surface 76 of the end piece 33, locally delimiting the channel 4, no longer acts as the seal bearing for the pin 108 and acts simply as a guide for the insertion of the latter into the part of the channel 15 delimited by the cylindrical surface 77 which, in this variant, constitutes the seal bearing of the body 33 for the pin 108 when it is in the blanking position, in other words in the position shown in FIG. 5.

Complementarily, instead of being truncated cone shaped of revolution around the axis 4, the external peripheral service 110 of the rod 108 is cylindrical of revolution around the axis 4 with a diameter approximately identical to that of the surface 77 in such a way that, in the blanking position shown in FIG. 5, a seal contact in respect of the material in a plastic state is established between the surfaces 110 and 77.

Towards the cavity 2, the external peripheral surface 110 of the rod 108 is connected to the front surface 109 of the latter which, instead of being plane and perpendicular to the axis 4 whatever the shape of the surface 3 as is the case in the mode of implementation described with reference to FIGS. 1 to 4, is configured in such a way that, when the pin 108 is in the blanking position and is taken to the temperature which it must have during an injection operation, this surface 109 is integrated, in the same way as the front surface 78 of the end piece 33, with the surface 3 of the mould 2.

To be sure, when the surface 3 is plane and perpendicular to the axis 4 in a localised zone around the latter, the surfaces 78 and 109 are plane and perpendicular to this axis 4 but, in the most frequent case in which the surface 3 is curved and/or the axis 4 does not cut it at right angles, the surface 109 has, like the surface 78, a curved shape and/or and an oblique orientation relative to the axis 4 and the indexing provided by the engagement of the ends of the cotter pin 118 with the grooves 120 of the nut 122, by offering the possibility of orientating the pin 108 around the axis 4, relative to the nozzle 10, only in two positions mutually offset by 180° around this axis and one of which is clearly erroneous, allows the surface 109 to be re-orientated appropriately after each disassembly of the pin in order that this surface 109 is able to become as integral as possible, in the same way as the surface 78, with the surface 3 of the cavity 2 when the pin 108 is in its blanking position.

Naturally, in such a case, moving the pin 108 to its position of opening the channel 15 towards the cavity 2 presupposes that the pin distances itself sufficiently from the latter, along the axis 4, by sliding in the direction opposite to the direction 27 within the end piece 33 and the nozzle body 34, so as to allow the surface 109 to reach the zone of the channel 15 delimited by the internal peripheral surface 74.

In the case of this variant, the position of the pin 108, along the axis 4, corresponding to blanking and to the integration of its surface 109 with the surface 3 of the cavity, is determined, like the position corresponding to the opening of the channel 15 towards the cavity 2, by adjusting the stroke of the jack 114.

Naturally, other means could be used to provide the indexing of the pin 108 relative to the support 13, just as other means could be used to provide the indexing of the support 13 relative to the distributor 11, of the nozzle body 32 relative to the support 13 and of the end piece 33 relative to the body 32, it being understood that the present invention relates to any form of indexing making it possible to give to a nozzle 10 including, where appropriate, its blanking pin 108 and to preserve for it at re-assembly after disassembly a pre-set orientation, around its axis 4 merged with that of an injection well 5, and a pre-set position along this axis, such that it can become as integral as possible with the surface 3 of the cavity 2 which it is intended to feed.

In particular, the cotter pin 49 providing the indexing between the nozzle body 32, the assembly support 13 and the distributor 11, the cotter pin 90 providing the indexing between the end piece 33 and the nozzle body 32 and the cotter pin 118 providing by cottering the indexing of the pin 108 relative to the distributor 11, through the extension 111 of the pin 108 and the tubular sleeve 121, could be replaced respectively by a contour made in a solid bloc with one of the components between which the indexing is to be carried out, it being understood that only one or some of these cotter pins could be so replaced.

This has been shown in FIG. 6, to which reference will now be made and in which will be found, under the same numerical references, the components or component parts which have been described relative to the embodiment in FIGS. 1 to 4, either identically, or with immaterial differences in respect of the present invention, or with differences which will be described subsequently, the replacement of the cotter pin 118 by a boss bearing the same numerical reference, made all of a piece with the extension 111 of the blanking pin 108 and projecting on only one side of this extension 116, along the axis 119. This boss 118 engages, with the possibility of sliding parallel to the axis 4 with no possibility of rotating around it, in a then single rectilinear slot 120, parallel to the axis 4, of the tubular sleeve 121 which, like the one which was described with reference to FIGS. 1 to 4 or 5, is connected to the distributor 11, but in a way different from that which was described with reference to FIGS. 1 to 4 and will be described subsequently.

Figure 6:
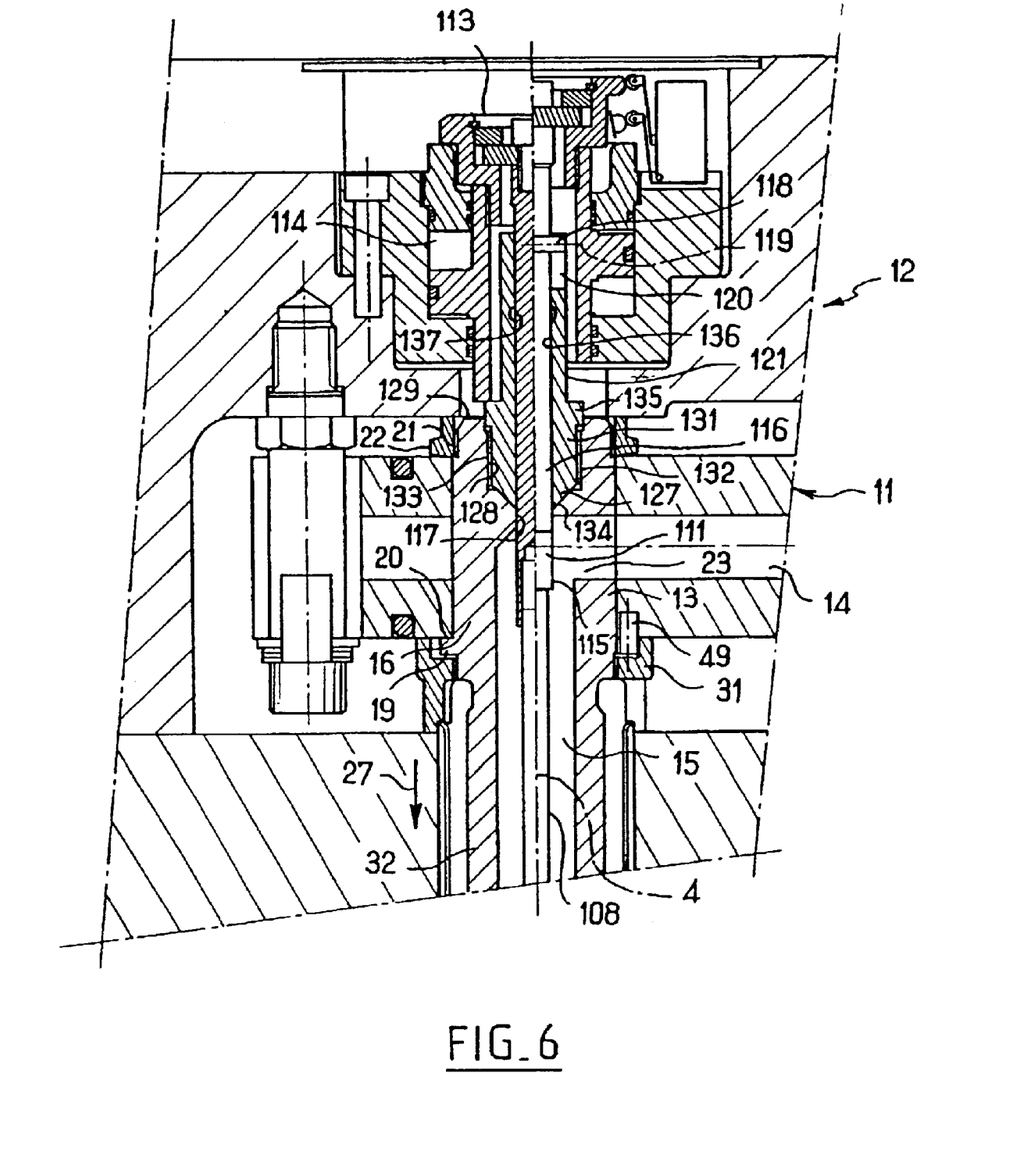
FIG. 6 shows an embodiment variant of a detail given the reference VI in FIG. 1, in a view similar to that in this FIG. 1.

Indeed, FIG. 6 shows embodiment variants of a certain number of the components or component parts which were described with reference to FIGS. 1 to 4 or 5, it being understood that these different variants could be found independently of each other in an injection device according to the invention, in other words combine insofar as they are compatible the embodiments described respectively with reference to FIGS. 1 to 4 and to FIG. 6, and with reference to FIG. 5.

Another variant shown in FIG. 6, in comparison with the embodiment described with reference to FIGS. 1 to 4 or 5, concerns the assembly of the nozzle body 32 on the distributor 11.

Indeed, whereas the distributor 11 remains unchanged, the support 13 for assembling the injection nozzle 10 on the distributor 11 is, in the embodiment shown in FIG. 6, made in a single piece with the body 32 of which it constitutes a coaxial extension, which engages coaxially in the channel 16 of the distributor 11 and to which has also been assigned the numerical reference 13. In the same way as the support 13 independent of the body 32, this extension 13 of the body 32 is locked integrally onto the distributor 11 by the rings 22 and 31 which are found again identically or approximately identically, and which are in this case screwed onto this extension. The flange 19, defining the annular plane surface 20 in support against the distributor 11 in the direction opposite to the direction 27, is then constituted by a collar, bearing the same reference, made in one piece with the body 32; the ring 22 retains its dual function of fixing, in this case the extension 13 of the body 32, onto the distributor 11 and of bracing in respect of the plate 12 whereas the ring 31, losing its assembly function, retains only its bracing function between the distributor 11 and the mould 1 and the cotter pin 49, which is found again identically but which could also be made in one piece with the nozzle body 32, then provides exclusively the indexing of the latter relative to the distributor 11.

In this case, naturally, it is the nozzle body 32, which itself, at the level of its extension 13 inserted inside the distributor 11, defines the angled channel 33 communicating with the channel 14 of the distributor 11 and embodying along the axis 4 the outlet for the material in a plastic state coming from the distributor 11 towards the channel 15 of the nozzle 10.

The mutual connection and the sealing between the extension of the body 32 and the distributor 11 may be perfected, in the case of the embodiment in FIG. 6, or between the support 13 independent of the body 32 and the distributor 11, in the case of the embodiment in FIGS. 1 to 4, or of that in FIG. 5, by fitting respectively the extension 13 of the body 32 or the support 13, with force and for example when hot, coaxially into the hole 16 of the distributor 11.

In association with such a direct engagement of an extension 13 of the body 32 in the hole 16 of the body 11, it would be possible to adopt an integral mode of connecting the sleeve 121 with this extension of the body 32 identical to the one which was described with reference to FIGS. 1 to 4, in relation to the integral connection between the sleeve 121 and the assembly support 13 independent of the body 32.

However, in FIG. 6, as was indicated above, a different mode of connection has been shown in the sense that the assembly provided in the example shown in FIGS. 1 to 4 by the nut cover 122 integral with the tubular sleeve 121, the threaded end piece 123 integral with the support 13 and the ring 124 for sealing between the extension 111 of the pin 108 and the assembly support 13, is replaced by an assembly which will now be described, and which could moreover be found between the sleeve 121 and the assembly support 13 independent of the body 32 in an embodiment otherwise complying with FIGS. 1 to 4 or 5.

To provide this assembly, the internal peripheral surface 117 of the coaxial channel hole 116 of the extension of the rod 108 has a shape cylindrical of revolution around the axis 4, with a diameter approximately identical to that of the external peripheral surface 115 of the extension 111 of the rod 108, only in a zone directly adjacent to the channel 23.

In the direction opposite to the direction 27, this internal peripheral surface 117 is connected to an internal peripheral surface 127 of the hole 116, which is truncated cone shaped of revolution around the axis 4 and flares in the direction opposite to the direction 27, by forming relative to the axis 4 an angle which, by way of a non-restrictive example, may be of about 45°.

This truncated cone shaped surface 127 is itself connected, in the direction opposite to the direction 27, to an internal peripheral surface 128 of the hole 126, which is cylindrical of revolution around the axis 4, with a diameter greater than that of the internal peripheral surface 117 but smaller than that of the screw thread 21 for receiving the ring 22, and this internal peripheral surface 128 is connected, in the direction opposite to the direction 27, to an annular plane surface 129, of revolution around the axis 4 to which it is perpendicular, which surface 129 delimits the body 32 in the direction opposite to the direction 27.

The internal peripheral surface 128 has a female screw thread 130 of axis 4.

By this female screw thread 130, the body 32 receives in an integral way, by coaxial screwing, a plug 131 bearing integrally the sleeve 121, for example by manufacture in a single piece.

To this end, in the direction of a distancing relative to the axis 4, the plug 131 is delimited, over a dimension greater than that of the surface 128, measured parallel to the axis 4, by an external peripheral surface 132 cylindrical of revolution around the axis 4 and bearing a coaxial screw thread 133, complementing the female screw thread 130 of the surface 128. In the direction 27, this external peripheral surface 132 is connected to a surface 138 truncated cone shaped of revolution around the axis 4 and directly complementing the surface 127 in such a way that, by screwing the plug 131 tightly into the hole 116, by engagement of the screw thread 133 with the female screw thread 130, until the surface 134 is supported in the direction 4 on the surface 127, by conforming to the shape of the latter, the plug 131 may be connected to the nozzle body 32 in a perfectly defined relative position, establishing a seal between them. In the direction opposite to the direction 27, at the junction between the plug 131 and the sleeve 121, the external peripheral surface 132 is connected to a collar 135 made in one piece with the plug 131 and the sleeve 121, which collar 135 is immaterial in respect of the present invention and is designed so as not to hinder the possibility of mutual contact between the surfaces 134 and 127 when the plug 131 is screwed tightly into the hole 116.

Towards the axis 4, the plug 131 and the sleeve 121 are delimited by respective zones of a same internal peripheral surface 136 cylindrical of revolution around the axis 4 with a diameter as close as possible to that of the external peripheral surface 115 of the extension 111 of the pin 108 in order to provide guiding with relative sliding along the axis 4. To provide a seal between the surfaces 115 and 136 in respect of the thermoplastic material advancing particularly in the channel 23, the surface 136 is channelled out with at least one groove 137 annular of revolution around the axis 4, placed at an intermediate level between the slot 120 of the sleeve 121 and the plug 131 and able to receive a sealing material.

Lastly, the embodiment shown in FIG. 6 is distinguished from the one described with reference to FIGS. 1 to 4 or 5 by the embodiment of the jack 114 and of the motion transmission component 113.

Indeed, while the jack 114 is placed laterally, perpendicular to the axis 4 and while the transmission component 113 comprises a transmission angle at 90° in the example described with reference to FIGS. 1 to 4 or 5, the jack 114 is a coaxial jack with a pin 108 and the transmission component 113 provides a connection without play along the axis 4 with the extension 111 of the pin 108 with possibility of relative displacement perpendicular to this axis in the case of the embodiment shown in FIG. 6, in a way also known to a man skilled in the art and therefore not described in detail. The left and right halves of FIG. 6 show the jack 114 and the pin 108 in two limit positions, relative to the distributor 11 and to the nozzle body 32, these positions corresponding respectively to the blanking of the channel 15 at the level of the nozzle end piece 33, as was described with reference to FIGS. 1 to 4 and 5, with integration of the front surface 109 of the pin 108 with the surface 3 of the moulding cavity 2 in the case of an embodiment in accordance with FIG. 5, and to the opening of the channel 15 towards the moulding cavity 2.

It is well understood that this design of the jack 114 and of the transmission component 113 could also be adopted in the context of a device according to the invention otherwise designed such as was described with reference to FIGS. 1 to 4 or 5, just as the jack 114 and the transmission component 113 shown in FIG. 1 could be adopted, in place and instead of those which were described with reference to FIG. 6, in conjunction with a device according to the invention otherwise in accordance with what was described with reference to this FIG. 6.

However, the embodiment variants of the device according to the invention are not restricted to a combination of the compatible variants, described respectively with reference to FIGS. 1 to 4, with FIG. 5 and with FIG. 6, and many other variants could be brought to the arrangements which have just been described without for all that departing from the context of the present invention.

What is claimed is:

1. A device for injecting material in a plastic state into a moulding cavity, comprising:
    a distributor of material in a plastic state, comprising at least one outlet for material in a plastic state, placed along a pre-set axis,
    an injection nozzle comprising at least one component which is connected to the distributor by a detachable connection means and defines for the injection nozzle a front surface configured in such a way as to become integral with the moulding cavity, the injection nozzle comprising at least one channel for material in a plastic state, placed along said axis, placed in a fluid relationship with said outlet, and emerging in said front surface,
    controlled means of blanking said channel, wherein said detachable connection means comprises:
        means of indexing the angular position of said front surface in relation to the distributor, around said axis, and locking means fixing said front surface in relation to the distributor in the relative angular position imposed by the indexing means.

2. A device according to claim 1, wherein the injection nozzle comprises a nozzle end piece defining the front surface and a nozzle body inserted between the distributor and the nozzle end piece and connected to one and the other by a respective detachable connection means one of which, at least, is a detachable connection means and comprises:
    means of indexing in a relative angular position around said axis,
    means of mutual locking in the relative angular position imposed by the indexing means.

3. A device according to claim 2, wherein the distributor comprises a channel for assembling a nozzle body, provided along said axis, and in that the nozzle body is engaged coaxially in said channel and defines said outlet.

4. A device according to claim 1, wherein the distributor comprises a channel for assembling a support for assembling the injection nozzle, provided along said axis, and a support for assembling the injection nozzle, engaged coaxially in said channel, defining said outlet and connected to the distributor and to the injection nozzle by a respective connection means one of which, at least, is a detachable connection means and comprises:
    means of indexing in a relative angular position around said axis,
    means of mutual locking in the relative angular position imposed by the indexing means.

5. A device according to claim 1, wherein the indexing means comprise a cottering parallel to said axis.

6. A device according to claim 4, wherein the support for assembling the injection nozzle is connected to the distributor and to the injection nozzle by a connection means comprising:
    means of indexing in a relative angular position around said axis,
    means of mutual locking in the relative angular position imposed by the indexing means, in that the indexing means comprise a cottering parallel to said axis,
    and in that cottering is common to the means of indexing the assembly support in an angular position relative to the distributor and to the means of indexing the injection nozzle in an angular position relative to the assembly support.

7. A device according to claim 1, wherein the mutual locking means comprise a mutual clamping by ring annular of revolution around said axis, screwed by rotation around the latter.

8. A device according to claim 1, wherein the controlled blanking means comprise at least one blanking pin mounted with axial sliding inside said channel between a blanking position of the latter and an open position of the latter, controlled means to make the pin slide from one to the other of said positions, located on the opposite side from the injection nozzle relative to the distributor along said axis and comprising controlled drive means, a component for transmitting motion between the drive means and the pin, placed in the axial extension of the latter, and a detachable means of connecting said component and the pin in an axial direction, allowing a relative free rotation around said axis, and means of indexing the pin relative to the distributor in a preset relative angular position around said axis.

9. A device according to claim 3, wherein the controlled blanking means comprise at least one blanking pin mounted with axial sliding inside said channel between a blanking position of the latter and an open position of the latter, controlled means to make the pin slide from one to the other of said positions, located on the opposite side from the injection nozzle relative to the distributor along said axis and comprising controlled drive means, a component for transmitting motion between the drive means and the pin, placed in the axial extension of the latter, and a detachable means of connecting said component and the pin in an axial direction, allowing a relative free rotation around said axis, and means of indexing the pin relative to the distributor in a preset relative angular position around said axis, and further characterised in that the means of indexing the pin relative to the distributor are means of indexing the pin relative to the injection nozzle.

10. A device according to claim 4, wherein the controlled blanking means comprise at least one blanking pin mounted with axial sliding inside said channel between a blanking position of the latter and an open position of the latter, controlled means to make the pin slide from one to the other of said positions, located on the opposite side from the injection nozzle relative to the distributor along said axis and comprising controlled drive means, a component for transmitting motion between the drive means and the pin, placed in the axial extension of the latter, and a detachable means of connecting said component and the pin in an axial direction, allowing a relative free rotation around said axis, and means of indexing the pin relative to the distributor in a preset relative angular position around said axis and where the means of indexing the pin relative to the distributor are means of indexing the pin relative to the support for assembling the injection nozzle.

11. A device according to claim 8, wherein the indexing means comprise a cottering parallel to said axis.

12. A device according to claim 8, wherein the blanking pin comprises a front surface configured in such a way that it can become integral with the moulding cavity in its position of blanking said channel.

* * * * *